O. G. EWINGS.
Cotton Plow.
No. 11,601.
Patented Aug. 29, 1854.
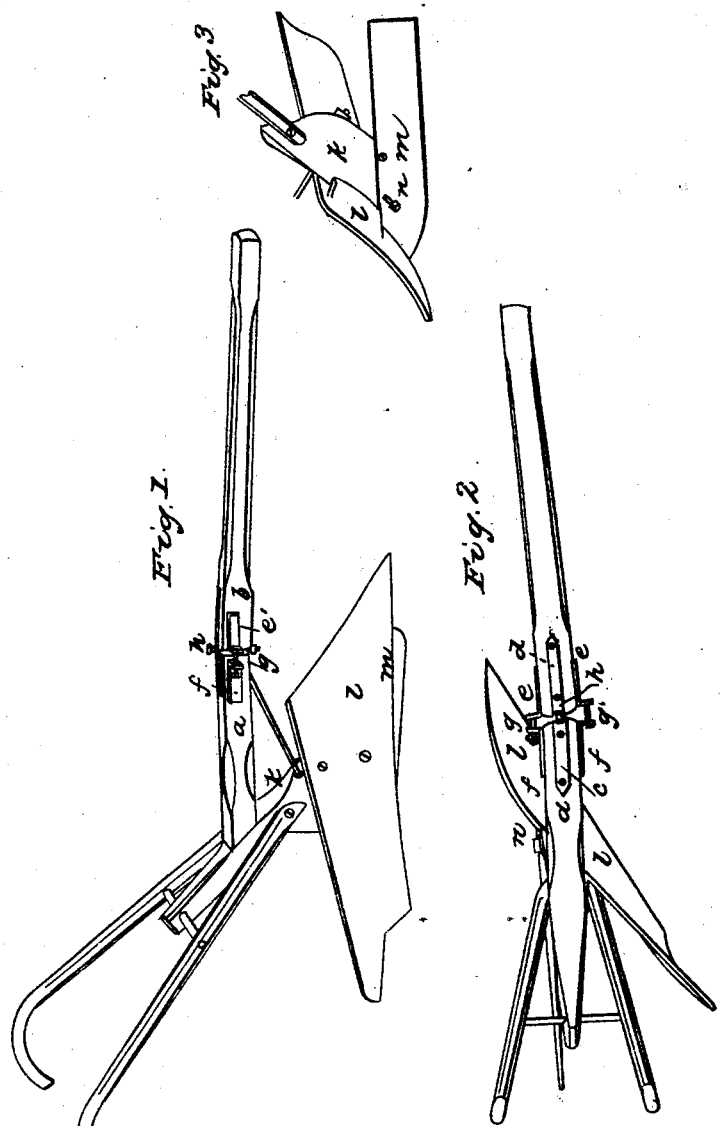

UNITED STATES PATENT OFFICE.

O. G. EWINGS, OF HEART PRAIRIE, WISCONSIN.

IMPROVEMENT IN PLOWS.

Specification forming part of Letters Patent No. 11,601, dated August 29, 1854.

*To all whom it may concern:*

Be it known that I, O. G. EWINGS, of Heart Prairie, in the county of Walworth and State of Wisconsin, have invented a new and useful Improvement in Plows; and I do hereby declare that the following is a full and exact description thereof.

The nature of my improvement consists in making the beam of the plow in two pieces, united by a joint or hinge in such a manner that the forward end of the beam may be turned from side to side when desired.

To enable others skilled in the art to make and use my invention, I will proceed to describe its construction and operation, reference being had to the annexed drawings, forming a part of this specification, in which—

Figure 1 is a perspective view of my improvements; Fig. 2, a top view; Fig. 3, a side view.

Similar letters refer to like parts.

$a$ is the hind portion of the beam; $b$, forward portion of the same; $c\ d$, hinges; $e\ e'\ f\ f'$, adjusting-irons; $g\ g'$, adjusting-screws; $h$, bolt; $k$, standard; $l$, mold-board; $m$, landside; $n$, adjusting-screw.

My first improvement relates to the beam of the plow, which is composed of two parts, $a$ and $b$, as seen in Figs. 1 and 2. The two parts are connected together by means of the hinges $c\ d$ and bolt $h$. These hinges permit the front end of the beam to bend, so that the line of draft may at any time be changed at pleasure and secured in any given position by employing the adjusting-screws $g\ g'$. Fig. 2 shows the front end of the beam $b$ thrown out of direct line and secured, the screw $g$ being withdrawn a little and the screw $g'$ being correspondingly screwed up. This adaptation of the beam to a change of draft will be found of great utility in tending corn and all other crops in drills, for it enables the plowman to bring the plow close up to the plants, while the horse travels in the center or at the side of the furrow; but it is by no means necessary that the beam should be screwed.

I find by practice that an important advantage of the jointed beam is in working it loose free of the set-screws. The plow is thus at all times more completely under the control of the plowman than is the ordinary plow. In cultivating drill-crops especially the advantage of the jointed beam working loose is demonstrated, since the plowman can hold the plow in any desired position and cause it to approach with nicety close to the plant or sheer it off, as the occasion requires, always independent of the horse.

In plowing out corn and other drill crops for the first time it is generally desirable to run the plow very lightly over the ground—just deep enough to cut off the weeds. This is done with great facility by my plow.

The economical advantages of tending crops by employing cultivating-plows instead of hoe and hand labor are too well known to require explanation from me.

I believe I have invented an implement which, while it is cheap in construction, possesses manifest superiority over anything of the kind employed for the purpose.

Having thus described my invention, I claim—

The jointed beams $a\ b$, in combination with the adjusting-screws $g\ g'$, as described.

O. G. EWINGS.

Witnesses:
THOMAS WATERMAN,
G. W. WATERMAN.